United States Patent [19]

Riccio et al.

[11] 4,314,294
[45] Feb. 2, 1982

[54] TAPE CASSETTE HOLDER

[75] Inventors: Pasquale R. Riccio, Salem; George H. Manning, Nashua, both of N.H.

[73] Assignee: MFE Corporation, Salem, N.H.

[21] Appl. No.: 139,672

[22] Filed: Apr. 14, 1980

[51] Int. Cl.³ .................. G11B 15/24; G11B 23/04
[52] U.S. Cl. .................................. 360/96.6; 242/199
[58] Field of Search .............. 360/96.6, 96.5, 96.1, 360/93, 132, 137; 242/197–200

[56] References Cited

U.S. PATENT DOCUMENTS

| | | | |
|---|---|---|---|
| 3,832,734 | 8/1974 | Childress et al. | 360/96.6 |
| 3,950,787 | 4/1976 | Hosaka | 360/93 |
| 4,017,900 | 4/1977 | Katsurayana | 360/96.6 |
| 4,184,182 | 1/1980 | Santoro | 360/96.6 |

Primary Examiner—Alfred H. Eddleman
Attorney, Agent, or Firm—Cesari and McKenna

[57] ABSTRACT

A front loading tape cassette holder comprises a support surface which supports a read/write head and a pair of abutments defining positioning surfaces and mounted to the support surface on each side of the read/write head. A door is hinged to the support surface adjacent the abutment positioning surfaces and the door is swingable between a closed position parallel to the support surface and an open position wherein it is oriented at an acute angle with respect to the support surface. Cantilevered leaf springs are mounted to the surface of the door opposite the abutments. When a cassette is placed on the door, the leaf springs guide the active edge of the cassette to the abutments and, when the door is swung toward its closed position, the springs urge that edge onto the positioning surface in a centered condition with respect to the read/write head. Also, when the door is fully closed, the springs bias the cassette against both the support surface and the abutments. A latch is also provided for releasably locking the door in its closed position and, when the latch is released, the same springs urge the door to its open position.

15 Claims, 5 Drawing Figures

TAPE CASSETTE HOLDER

This invention relates to a tape deck or holder used to read from and write on a magnetic tape in a cassette. It relates more particularly to an edge-loading cassette holder which drives the tape reel-to-reel.

BACKGROUND OF THE INVENTION

Edge-loading tape cassette holders have been in use for some years. Such units are disclosed, for example, in U.S. Pat. Nos. 3,612,432 and 3,766,327. Generally, this type of holder includes a frame which supports the magnetic read/write head. The frame is formed with guides or stops adjacent the read/write head which positions the active edge of the cassette so that the exposed section of tape engages the head. The frame also supports drive spindles to move the tape and includes some sort of retainer for supporting the cassette on the spindles.

The cassette is inserted active edge first into the holder and the retainer positions the cassette either in an operating plane or in a loading plane. In the former plane, the cassette is oriented so that the recording head engages the tape in the cassette and the drive spindles project into the usual sprocket holes in the side of the cassette. In the latter plane, the cassette is angled relative to the operating plane so that the cassette is free of the drive spindle and can be grasped by the operator and withdrawn from the tape deck. The retainer which supports the cassette is swingable between two positions to move the cassette between its aforesaid loading and operating planes.

Edge loading, reel-to-reel driving tape decks should have wide application, particularly in connection with computer data storage and transfer operations. This is because it is mechanically a simpler system than the tape decks most commonly used which hold a standard Phillips cassette and shown, for example, in U.S. Pat. Nos. 3,394,898 and 3,394,899. More particularly, the tape holder of the general type with which we are concerned here does not depend upon a capstan to advance the tape. Consequently, it does not require the relatively complex cassette shift mechanism or capstan retract arrangement required to position the standard Phillips cassette so that the tape engages the recording head and the capstan projects properly into the cassette.

However, some problems do exist with the edge loading types of tape holders. The cassette may become hung up on the drive spindles as it is loaded into the holder. Also the cassette may not be held securely enough, particularly in its loading position. Indeed, some cassettes have actually fallen out of the holder onto the floor, resulting in damage to the tape or cassette.

Other problems have been encountered with prior edge loading tape decks. For example, some are not rugged and reliable enough for sustained usage, particularly in computer applications. The repeated loading and unloading of the cassettes may affect the holder so that it no longer properly positions the cassette. Also certain parts of the holder may tend to lose their effectiveness because of wear. Additionally, prior cassette holders of this general type have tended to be relatively complex and therefore expensive and difficult to repair and maintain. Finally, in the case of some conventional holders of this general type, the user has to take considerable care when positioning the cassette in the holder when moving the retainer to its operating position. Otherwise, the holder's cassette retainer does not close and lock properly.

SUMMARY OF THE INVENTION

Accordingly, the present invention aims to provide an improved edge-loading tape cassette holder.

Another object is to provide a holder of this general type which is easy to load and unload.

A further object of the invention is to provide an edge-loading cassette holder which firmly supports the cassette in both its loading and operating planes.

A further object of the invention is to provide such a cassette holder which is also of relatively simple construction and therefore easy to repair and maintain.

Still another object of the invention is to provide a holder for a tape cassette which is arranged so that the cassette does not become hung up on the drive spindles during the loading and unloading operations.

A further object is to provide such a cassette holder which is easy to operate.

A specific object is to provide an improved read/write head mount for a cassette holder.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the present tape cassette holder includes a housing which contains the usual magnetic read/write head and a pair of spaced-apart drive spindles which are arranged to project into the sprocket holes in the tape cassette reels. The head is mounted to a special support block to be described later which precisely locates the head in the housing. Also included are the necessary electric motors for advancing and rewinding the tape and the usual support elements such as relays and switches to control tape movement during the read, write and rewind and fast forward operations.

The tape cassette used with the present holder is a reel-to-reel cassette such as an ANSI/ECMA cassette. Its tape has two tracks, one of which is "active" depending upon which side of the cassette is "up". The cassette is supported in its loading and operating planes by a swinging door which is hinged to the housing adjacent abutments positioned in the housing on each side of the read/write head. When the door is in its open position, it supports the cassette at an angle of about 45 degrees with respect to the housing and with its active edge engaging the outermost abutments.

When the door is in its closed position, it supports the cassette with its active edge resting on the abutments in a generally vertical plane against a housing wall. The abutments roughly position that edge in the three basic coordinates with respect to the head with sufficient accuracy to permit locating dowels or pins on the door to engage in the usual locating holes in the cassette to accurately locate the cassette with respect to the head. The head, as well as the wheel of a tachometer which monitors tape speed, project through registering openings in the active edge of the cassette and are engaged by the tape. Two of the abutments, one on each side of the read/write head, also project into the cassette so that they not only help to position the cassette but also function as tape guides. Also, the drive spindles project into the side of the cassette in order to help position the cassette and ultimately to drive the tape reels. A finger-actuated latch hinged to the housing wall locks the door in its closed position.

In edge-loading cassette holders of this general type, it is highly desirable from a marketing standpoint that the operator be able to insert the cassette into the holder without having to take any particular pains to position the cassette, other than insuring that its active edge faces downward and that the proper side of the cassette is in the up or play position. In other words, the operator should be able to simply drop the cassette onto the door and close the door.

The holder should shift or reposition the cassette as necessary such that when the door approaches its closed position, the various openings in the cassette are automatically in register with the read/write head, drive spindles and the various other components of the holder which they are intended to receive. Resultantly, when the door is fully closed and latched, the cassette is assuredly maintained in an operating plane which is properly aligned with respect to those components. Likewise, when the door is unlatched and opened in order to remove the cassette or turn it over, the door as well as the cassette should swing down to the loading plane so that the cassette is readily accessible to the operator.

The present cassette holder obtains very accurate positioning of the cassette in its operating plane when the door is closed, while permitting ready insertion and removal of the cassette when the door is open. For this, the holder includes a unique juxtaposition of the cassette-locating abutments and a set of cantilevered springs, which abutment-spring combination gradually guides the casually inserted cassette into the proper operating plane and position as the door is closed. When the door is latched, that same abutment-spring combination maintains the cassette in its proper operating plane even though the holder may be shaken and jostled. Still further, when the door is unlatched, these same springs reliably urge the door to its open position in all orientations of the holder.

Also, to prevent "hang up" between the drive spindles and the reel sprocket holes in the cassette, each spindle has a spring-loaded carrier for its teeth which is retractable axially. Consequently, if the spindle teeth and sprocket teeth should find themselves in register when the cassette holder door is latched, the sprocket teeth push the spindle teeth on the carrier "out of the way". Then when the spindles are turned for the first time, the spindle teeth are rotated out of register with the sprocket teeth and spring back into position between those teeth.

Thus the present cassette holder is of relatively simple construction. Yet it permits the operator to load and unload cassettes into and from the holder quite easily with assurance that, when a cassette is in its operative position in the holder during a read or write operation, the cassette is properly located relative to the various switches and detectors in the holder and the moving cassette tape is properly contacted by the read/write head and the tachometer wheel.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figures 1, 2:
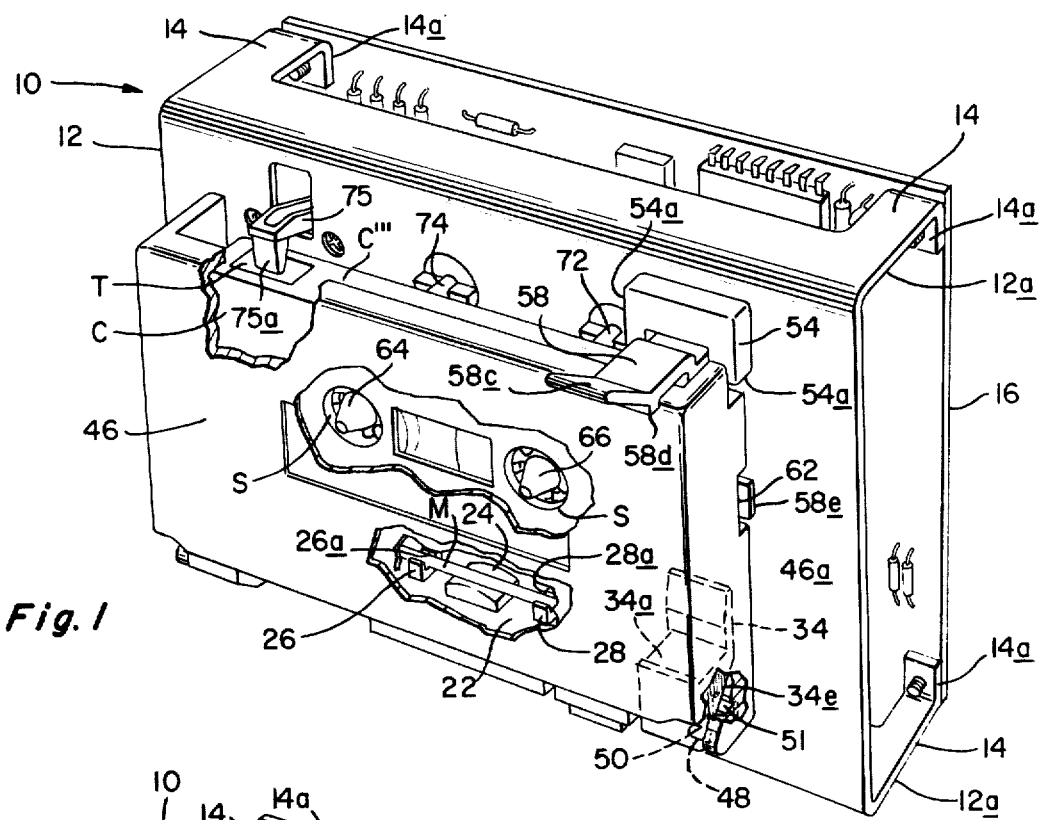
FIG. 1 is a perspective view with parts broken away of a tape cassette holder made in accordance with this invention showing the holder in its operating position.
FIG. 2 is a perspective view of the cassette holder in its open or loading position.

Referring to FIGS. 1 and 2 of the drawings, the holder indicated generally at 10 comprises a generally rectangular plate 12 which functions as a support for the various electromechanical components of the holder such as the spindle drive motors, the read/write head, the tachometer and the various detectors and interlock switches which comprise the holder. The upper and lower edge margins of plate 12 are bent rearwardly to form flanges 12a. Also a pair of legs 14 project rearwardly from the opposite ends of each flange to support a printed circuit board 16, the board being connected to the inwardly turned ends 14a of those legs.

The circuit board 16 carries the various integrated circuits, resistors, capacitors and the interconnecting printed circuit paths required to support the aforesaid electromechanical components of the holder. The board 16 also carries a suitable electrical connector (not shown). This connector connects to a mating connector on a harness leading to the computer or other system which receives electrical signals from or supplies them to the tape holder 10.

Figure 3:
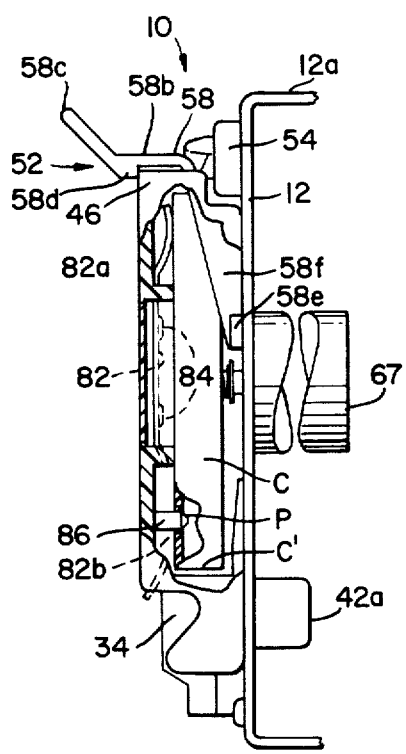
FIG. 3 is an elevational view showing the holder closed.
Figure 4:
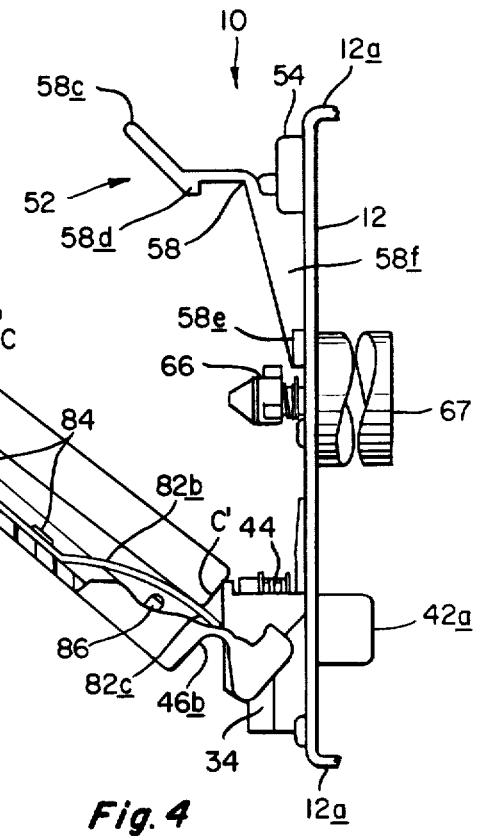
FIG. 4 is a similar view of the holder in its open or loading position.

The holder 10 is designed to receive a standard reel-to-reel cassette C and support that cassette in an operating plane against plate 12 as illustrated in FIG. 3 during a read or write operation and in a readily accessible loading plane wherein it is oriented at an angle relative to plate 12 as illustrated in FIG. 4 to facilitate insertion of the cassette into, and its removal from, the holder. To this end, a generally rectangular block 22 is mounted to the housing plate 12 near the bottom thereof. This block, which will be described in detail later, precisely locates a conventional read/write head 24 which projects up from the block. Also projecting up from that block at each side of head 24 are a pair of bosses 26 and 28. The upper ends of these bosses are laterally grooved at 26a and 28a respectively and they are intended to project into the cassette C to both help roughly position the cassette holder during loading and to guide the moving tape M therein during a read or write operation.

As best seen in FIG. 2, a pair of blocks 32 and 34 are mounted to plate 12 outboard of block 22 near the side edges of the plate. These blocks have top surfaces 32a and 34a respectively which are in the same plane as the top surface 22a of block 22. Blocks 32 and 34 have laterally extending raised lips 32b and 34b respectively which are basically extensions of the block front walls. Likewise, laterally extending rear lips 32c and 34c respectively extend upward at the rears of the blocks, the upper segments 32d and 34d respectively of such lips being tapered toward plate 12. These block surfaces 32a and 34a as well as the lips 32b, 34b, 32c and 34c, help to position the active edge of the cassette C and, for this purpose, the distance between the respective lips 32b and 32c on the one hand and 34b and 34c on the other are spaced apart a distance only slightly greater than the thickness of the cassette C.

Still referring to FIG. 2, a third block 38 is mounted to plate 12 between blocks 22 and 34. Block 38 functions as a journal for the shaft 42 of a tachometer 42a mounted to the rear face of plate 12 (FIGS. 3 and 4). Rotatively mounted to the shaft 42 and projecting upwards from block 38 is a tachometer wheel 44 whose rim is parallel to and projects slightly above the groove 28a in boss 28. The tachometer and its wheel 44 are preferably of the type described in U.S. Pat. No. 4,107,745.

As best seen in FIG. 1, hinged to the outside walls of blocks 32 and 34 is a door 46 having a pair of sidewalls 46a extending toward plate 12. A pair of pins 48 projecting from the lower ends of walls 46a are journalled in openings 50 formed in the outside walls of block 32 and 34. The door 46 can thus swing about its pivot pins between an open or lower position illustrated in FIGS. 2 and 4 wherein it lies at an angle of about 45 degrees with respect to the housing plate 12 to a closed or raised position illustrated in FIGS. 1 and 3 wherein it is more or less parallel to that plate. The outside walls of blocks 32 and 34 are undercut at 34e to accommodate a pair of lugs 51 which project laterally inward from the door sidewalls 46a. These lugs 51 engage the end walls of these undercuts to establish the open position of the door illustrated in FIG. 2. However, the lugs swing freely through the undercuts as the door is raised to its closed position shown in FIG. 1. The door sidewalls 46a are notched at 46b (FIGS. 2 to 4) to accommodate a front bezel (not shown). We have specifically illustrated plate 12 as being vertical and door 46 as opening downwards as this is the best orientation of the holder. It should be understood, however, that the holder will function effectively in other orientations, e.g. with door 46 opening sideways.

The door is maintained in its closed position by a latch indicated generally at 52 mounted to plate 12 near the top right hand corner thereof. The latch includes a C-shaped bracket 54 mounted to plate 12 and having a pair of spaced-apart depending legs 54a. As best seen in FIG. 2, positioned between legs 54a is a generally L-shaped latch member 58. The long leg 58a of the latch member extends downward parallel to plate 12, while the short leg 58b extends out perpendicular to that plate. Formed integrally with the latch member on opposite sides thereof at the junction of the two legs are a pair of laterally extending bearing pins 56. These pins are loosely journalled in lateral slots 57 formed in the rear faces of bracket legs 54a. The free end segment of the short leg 58b is angled upwardly at 58c so that the operator can easily engage and trip the latch member with his finger.

Also a depending nose 58d is formed at the base of the raised leg section 58c which nose engages over the upper edge of the door 46 when the door is in its closed position shown in FIG. 1. A weak leaf spring 60 (FIG. 2) is compressed between the latch member leg 58b and the bracket 54 to bias the latch member so that its nose 58d is urged toward the door edge. Projecting laterally from the lower end of the long leg 58a is a tab 58e which when the door is in its closed position extends through a notch 62 formed in the right hand side wall of that door.

Thus, with the door in its closed and latched position shown in FIG. 1, if the operator should lift the latch member leg segment 58c, the latch member will not only pivot, but also its loose journalling noted above permits the latch to lift vertically to some extent in opposition to the bias of spring 60. These combined motions enable the latch nose 58d to disengage from the top edge of the cassette and the latch member leg 58a to swing outward away from plate 12 so that the leg and tab 58e "kick" the door sidewall 46a outward toward its open or loading position shown in FIG. 2. The actual movement of the door to its loading position is caused by special spring means to be described presently. Obviously also when a cassette C is locked in its operating position shown in FIGS. 1 and 3, and the latch member is actuated as aforesaid, the latch member leg 58a and tab 58e will engage the rear face of the cassette and swing both the cassette and the door outward.

Referring now to FIGS. 2 to 4, the tape holder's drive spindles 64 and 66 project from housing plate 12 at spaced-apart locations directly above the read/write head 24. They are driven by motors 67 mounted to the rear of wall 12. The spacings between these spindles are standardized for the cassette C. Also appropriately positioned on plate 12 are various interlock switches commonly found on cassette holders. More particularly, there is a CASSETTE LOADED switch 72 which detects when the cassette is in its operating plane. There is a SIDE switch 74 which detects which side of the cassette is in the up or play position. Further there is a PROTECT switch 75 having an arm 75a which cooporates with a knock-out tab T on the cassette C to prevent the holder from performing an inadvertent write operation and thereby erasing the tape in the cassette.

Referring to FIG. 2, to detect end of tape, a lamp 76 is mounted in plate 12 directly above the boss 26. Light from the lamp shines down on the boss which is formed with a passage 78 extending down into block 22 and containing an optical refractor (not shown). The lower end of passage 78 houses a photosensor 80 which is arranged to receive light from the refractor. When the holder is in its operating mode and the tape is moving over the boss 26, the tape, which is opaque, normally prevents the light from illuminating the photosensor. However, near the end of the tape, there is a hole which permits the light to shine on the photosensor. The photosensor thereupon initiates an electrical signal which reverses or turns off the drive spindles, sounds an alarm or initiates other functions desired when the tape ends. These various interlock switches and the sensor circuitry are standard on many tape cassette holders of this general type and therefore they will not be described in detail here.

Referring now to FIGS. 2 to 4, mounted on the inner face of door 46 at opposite sides thereof are a pair of similar cantilevered springs 82. Each spring 82 is connected at its center to the door by pins 84. Each spring 82 has a relatively short upper segment 82a which bows away from the door and extends almost to the top thereof. Each spring also includes a relatively long lower segment 82b which also bows away from the door and extends down slightly beyond the lower edge thereof where its end 82c engages the front face of block 32 in the case of the left-hand spring and of block 34 in the case of the right-hand spring. Additionally, projecting from the inner face of door 46 between springs 82 are a pair of spaced-apart locating dowels or pins 86 having tapered ends. These pins are arranged to engage in the openings P in the front or rear face of cassette C in order to accurately position that cassette both vertically and laterally relative to head 24 when the cassette is in its operating plane as shown in FIG. 1.

Figure 5:
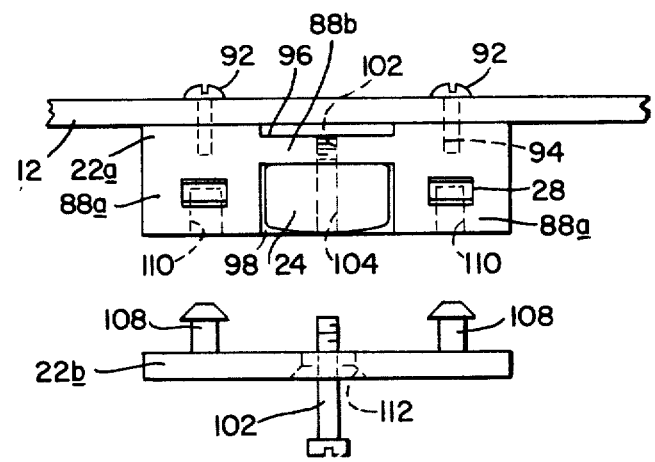
FIG. 5 is an exploded top plan view of the read/write head block used in the FIG. 1 holder.

Referring now to FIGS. 2 and 5, the block 22 which supports the read/write head 24 is of special construction. It comprises a main section 22a and a cover plate 22b. Section 22a is generally U-shaped. It has two identical, relatively massive, rectangular "legs" 88a on which the bosses 26 and 28 are formed. These legs are connected by a narrow web or bridge 88b.

Section 22a is positioned with its web 88b against plate 12 and is secured thereto by suitable threaded fasteners 92 extending through the plate and turned down into corresponding threaded passages 94 in legs 88a. A slot or relief 96 is formed in the surface of web 88b facing plate 12 so that when the block section 22a is secured to the plate, irregularities, bends or deformities in the plate surface do not cause bending or twisting of the block sections.

The read/write head 24 is positioned in the gap 98 between legs 88a and it butts against web 88b. The head is removably secured to the block section 22a by a threaded fastener 102 which extends through a front-to-back passage 104 in the head and is turned down into a mating threaded hole 106 in the web 88b. The electrical ground terminal for the head may be engaged to fastener 102 adjacent its head to ground the head.

The block section 22b is simply a rectangular plate having a pair of bayonet-type dowels 108 projecting from one face. These dowels are arranged to be pressfit into a corresponding pair of holes 110 in the fronts of legs 88a of section 22a. An access hole 112 is provided in section 22b opposite fastener 102 to permit the fastener to be removed so that the head 24 can be pushed out through an end of gap 98 should it become necessary to repair or replace the head.

Thus by means of block 22, the head is positively secured to a relatively massive part whose shape and dimensions are independent of irregularities in the supporting plate 12. Further, the head, except for its active surface, is protectively enclosed within that block. Thus stable and precise positioning of the head is assured.

When loading the holder with its door 46 in the open position shown in FIG. 2, the cassette is dropped onto the door between its sidewalls 46a with the active edge C' of the cassette facing downward. That edge thus rests on the front lips 32b and 34b of the abutments 32 and 34, and the underside of the cassette rests on the bowed leaf springs 82. In this connection, it should be mentioned that the lower spring segments 82b are bowed away from the door to an extent that they support the cassette above the ends of the pins 86 projecting from the door. Accordingly, the cassette is able to slide downwards on those springs until its active edge C' engages the block lips as aforesaid.

As the door 46 is swung upwards toward its closed position, the cassette is tilted towards a vertical plane, the spring segments 82b guiding the active edge of the cassette over the block lips 32b and 34b until the active edge of the cassette clears those lips and drops onto the block positioning surfaces 32a and 34a. With that, the read/write head 24, the bosses 26 and 28 and the tachometer wheel 44 are roughly aligned with their openings H, B and W respectively formed in the active edge C' of the cassette.

As the door is swung closer to its closed position, the locating pins 86 project into the openings P in the side of the cassette and the spindles 64 and 66 project into the reel sprocket holes S in the side of the cassette. Since the pins and spindles are tapered more or less to points, they shift the cassette laterally by the slight amount necessary to precisely align the cassette so its aforesaid openings can receive the protuberances from the holder. The spindles are preferably of the type having retractable toothed carriers as described in U.S. Pat. No. 3,791,604 to minimize the chance of spindle hangup on the cassette reel sprocket teeth as the door 46 is closed.

As the door reaches its closed position, the lower segments 82b of the spring press the lower corners of the cassette against the lips 32c and 34c of the positioning blocks 32 and 34 respectively, while the spring segments 82a press the upper corners of the cassette toward the housing wall 12 with the right-hand corner engaging against the depending leg 58a of the latch 52 inboard of web 58f. At this point, the latch nose 58d snaps over and engages the top edge of the door 46 thereby locking the door in its closed position with the cassette in its operating plane.

It is desirable to mention at this point that the special springs 82 perform still another important function. More particularly, in holders of this general type, a very small amount of lateral movement of the cassette C relative to head 24 can be tolerated without degrading the read/write operation of the holder. Indeed the lateral fit between the locating pins 86 and the holes P in the cassette is close enough to satisfy the lateral positioning requirement. However, for best operation, essentially no movement of the cassette toward or away from the head should occur as that gives rise to inaccurate transducing action between the head and tape and excessive wear of the tape guide surfaces 26a and 28a (FIG. 2). Accordingly and as best seen in FIG. 3 to inhibit any vertical movement of the cassette within the holder, the spring segments 82a and 82b are shaped so as to exert a downward component of force against cassette C. In other words, they bias the cassette downward and maintain the cassette edge C' tightly against the positioning surfaces 32a and 34a (FIG. 2) even when the holder is jostled. Accordingly, the vertical position of the cassette (and the moving tape therein) should never change relative to the head and guide surfaces.

When the cassette is locked in place, it engages and depresses the CASSETTE LOADED switch 72 and, depending upon which side of the cassette is "up", it either engages or not the SIDE switch 74. Also, the arm 75a of the PROTECT switch 75 bears on the cassette upper edge C". If the knock-out tab T in that cassette edge is present, the switch will enable the recording of information on the tape. On the other hand, if that tab is absent, the switch arm will drop into the resultant hole, thereby activating the switch so as to prevent a WRITE operation.

The cassette C is removed from the holder simply by lifting the latch leg segment 58c. This raises the latch in opposition to bias of spring 60 and also pivots the latch enabling the latch nose 58d to disengage from the cassette and causing its leg 58a to push the cassette outward away from the housing wall 12 so that the cassette disengages from the spindles 64 and rests on the door springs. Simultaneously, the door is pushed by spring segments 82b, whose lower ends engage blocks 32 and 34, to its loading position or plane shown in FIGS. 2 and 4. In that position, the cassette is readily accessible and can be grasped easily by the operator if he desires to reverse or replace the cassette. In the event that the door is in its raised latched position when no cassette is in the holder, the lifting of the latch member segment causes the tab 58f to engage the edge of the door notch 62 so as to swing the door away from plate 12, and again the door is immediately swung to its open position by spring segments 82b.

While we have described the holder in terms of its being an input/output device for a computer, it is equally applicable for holding audio and video tape cassettes which are driven reel to reel.

It will be seen from the foregoing, then, that the tape holder described herein is of relatively simple construction. Therefore, it is easy to service and maintain. Yet is enables the operator to load and unload a tape cassette quite easily when the holder's access door is in its open position. At the same time, due to the cooperation between the springs, the door and the various positioning blocks and abutments in the holder housing, the holder securely retains the cassette in its operating plane in proper alignment with the various active components of the holder.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A tape cassette holder comprising
   A. a general support surface,
   B. a read/write head mounted to the support surface,
   C. a pair of spaced-apart rotary drive spindles projecting from the support surfaces adjacent the read/write head,
   D. a pair of abutments mounted to the support surface on opposite sides of the read/write head, said abutments having positioning surfaces located more or less in the same plane as the read/write head,
   E. a generally rectangular door,
   F. means for hinging one long edge of the door to the support surface, said hinge line being parallel to the plane defined by said positioning surfaces and being located adjacent that plane, said door being swingable between a closed or operating position wherein the door lies more or less parallel to the support surface and an open or loading position wherein the door lies at an angle with respect to the support surface,
   G. means for releasably locking the door when the door is in its closed position, and
   H. means for establishing the door in its open position, and
   I. spring means mounted to the door surface facing the support surface, a first pair of said spring means extending out from the door near said one long edge thereof and resiliently engaging said abutments so as to bias the door toward its open position, a second pair of said spring means extending out from the door near the opposite edge thereof so that
      (1) when the door is in its open position, a conventional tape cassette having an active edge and sprocket holes and positioning pin openings in its faces can be placed onto the door so that its active edge is positioned by said abutments and a face of the cassette is positioned by the spring means and,
      (2) when the door is moved to its closed position, said first pair of spring means urge the active edge of the cassette onto said positioning surfaces so as to locate said edge with respect to the read/write head and said spring means also resiliently bias the cassette against the support surface so that said drive spindles seat properly in the sprocket holes in a face of the cassette.

2. The cassette holder defined in claim 1 wherein said door is formed with walls extending perpendicular to the general plane of the door to help position the cassette on the door.

3. The cassette holder defined in claim 1 and further including spaced-parallel ribs formed on each abutment, each said abutment positioning surface being located between said ribs.

4. The cassette holder defined in claim 1 wherein said spring means comprise a pair of elongated cantilevered springs located adjacent the edges of said door opposite said abutments, each said spring having spaced apart segments which project out from the door toward the support surface, the one end of one segment of each spring engaging a said abutment and both segments of both springs biasing the cassette both against the support surface and against the abutment positioning surfaces when the door is in its closed position.

5. The cassette holder defined in claim 4 and further including a pair of cassette locating pins projecting from the surface of the door facing the support surface, said pins projecting from the door a lesser distance than said one spring segments so that
   A. when the cassette is placed against the door said one spring segment guides the cassette over the ends of the pins enabling its active edge to engage the abutments and,
   B. when the door is moved to its closed position, the pins project beyond said one spring segment into the locating pin openings in a face of the cassette.

6. The cassette holder defined in claim 1 wherein the spring means not only bias the cassette against the support surface but also bias it against the abutment positioning surfaces when the door is in its closed position.

7. The cassette holder defined in claim 1 and further including a pair of bosses mounted to the support surface at each side of the read/write head inboard of the abutments, the upper surfaces of the guide means in the same general plane as the head being laterally grooved to accommodate the cassette magnetic tape moving over the read/write head when a cassette is positioned on the door and the door is in its closed position.

8. The cassette holder defined in claim 1 and further including an interlock switch means mounted to the support surface and engagable by a cassette supported by the door when the door is in its closed position.

9. The cassette holder defined in claim 1 wherein the releasable locking means comprises
   A. a latch hinged to the support surface, said latch having
      (1) a first portion projecting out from the support surface,
      (2) a second portion extending down between said support surface and the door, and (3) means for movably mounting the latch to the support surface so that the latch is movable between
  (a) a locked position wherein its first portion engages over an edge of the closed door and its second portion lies flush against the support surface, and
  (b) an unlocked position wherein said first latch portion is disengaged from the door edge and the second latch portion projects out away from the support surface so as to urge the door and a cassette supported thereby outward away from the support surface, and
B. means for biasing the latch toward its locked position.

10. The cassette holder defined in claim 9 wherein the movable mounting means permits some movement of the latch parallel to the support surface away from the door edge in opposition to the biasing means as well as pivotal movement of the latch relative to the support surface.

11. The cassette holder defined in claim 1 wherein said head is mounted to the support surface by way of a mounting block.

12. The cassette holder defined in claim 11 wherein the mounting block comprises A. a first generally U-shaped section having
  (1) a pair of spaced-apart, parallel, relatively massive legs, and
  (2) a relatively thin web connecting the legs and having a gap between the legs,
B. a second section, coextensive with the first section,
C. means for connecting the second section to the ends of the legs of the first section so that the second section bridges said gap,
D. means for connecting the first section to the support surface so that said web is adjacent that surface and the legs project out therefrom, and
E. means for mounting the head in said gap so that it projects from one end thereof.

13. The cassette holder defined in claim 12 and further including means defining a clearance space between said web and said support surface.

14. The cassette holder defined in claim 12 wherein the connecting means comprise cooperating male and female fastener means formed in opposing surfaces of the block sections.

15. The cassette holder defined in claim 12 wherein the mounting means includes a threaded fastener extending through said head and turned down into a threaded opening in the web.

* * * * *